US012766972B2

(12) United States Patent
Miyashiro et al.

(10) Patent No.: US 12,766,972 B2
(45) Date of Patent: Oct. 20, 2026

(54) BATTERY-TURBINE VEHICLE DEVICE

(71) Applicants: Kelly Miyashiro, Kapolei, HI (US); Floralyn Miyashiro, Kapolei, HI (US)

(72) Inventors: Kelly Miyashiro, Kapolei, HI (US); Floralyn Miyashiro, Kapolei, HI (US)

( * ) Notice: Subject to any disclaimer, the term of this patent is extended or adjusted under 35 U.S.C. 154(b) by 252 days.

(21) Appl. No.: 18/754,804

(22) Filed: Jun. 26, 2024

(65) Prior Publication Data

US 2025/0065725 A1 Feb. 27, 2025

Related U.S. Application Data

(60) Provisional application No. 63/578,070, filed on Aug. 22, 2023.

(51) Int. Cl.

| | |
|---|---|
| ***B60L 8/00*** | (2006.01) |
| ***F03D 3/04*** | (2006.01) |
| ***F03D 7/02*** | (2006.01) |
| ***F03D 9/11*** | (2016.01) |
| ***F03D 9/32*** | (2016.01) |
| *F03D 9/25* | (2016.01) |

(52) U.S. Cl.

CPC ............ *B60L 8/006* (2013.01); *F03D 3/0409* (2013.01); *F03D 7/0264* (2013.01); *F03D 9/11* (2016.05); *F03D 9/32* (2016.05); *F03D 9/25* (2016.05); *F05B 2240/941* (2013.01); *Y02T 10/7072* (2013.01)

(58) Field of Classification Search

CPC ...... F03D 3/009; F03D 3/0409; F03D 7/0264; F03D 9/11; F03D 9/25; F03D 9/32; B60K 8/006

See application file for complete search history.

(56) References Cited

U.S. PATENT DOCUMENTS 3,876,925 A 4/1975 Stoeckert
6,138,781 A * 10/2000 Hakala ...................... F03D 9/25 180/2.2
7,802,641 B2 9/2010 Friedmann
8,513,828 B1 8/2013 Ripley
2006/0210400 A1 9/2006 Hampl
2011/0100731 A1* 5/2011 Hassan ................... B60L 50/60 180/2.2
2011/0169267 A1 7/2011 Chen
2011/0266075 A1* 11/2011 Guzelimian .............. F03D 9/25 180/2.2

(Continued)

FOREIGN PATENT DOCUMENTS

WO WO-9901919 A1 * 1/1999 .............. B60L 58/12

*Primary Examiner* — Tinh T Dang

(74) *Attorney, Agent, or Firm* — Brennan, Manna & Diamond, LLC

(57) ABSTRACT

A battery-turbine vehicle device is disclosed, which is an electric vehicle with improved running times. The battery-turbine vehicle device comprises a wind turbine and a plurality of air ducts positioned through the vehicle and connected to the wind turbine. Thus, when the vehicle is running at high speeds, the wind turbine will either be charging the battery or running the vehicle. Accordingly, the device provides the electric vehicle with increased power and longer running times when operated at a given speed. Thus, the wind turbine helps generate additional power to the battery, reducing the number of times the vehicle needs to be charged while on the road.

13 Claims, 3 Drawing Sheets

(56) References Cited

U.S. PATENT DOCUMENTS

| | | | | |
|---|---|---|---|---|
| 2011/0309786 | A1 * | 12/2011 | Hassan | F03D 3/0427 290/55 |
| 2015/0165912 | A1 | 6/2015 | Patel | |

* cited by examiner

BATTERY-TURBINE VEHICLE DEVICE

CROSS-REFERENCE TO RELATED APPLICATION

The present application claims priority to, and the benefit of, U.S. Provisional Application No. 63/578,070, which was filed on Aug. 22, 2023, and is incorporated herein by reference in its entirety.

FIELD OF THE INVENTION

The present invention relates generally to the field of battery-turbine vehicle devices. More specifically, the present invention relates to an electric vehicle equipped with wind turbines to help increase the operational length of the vehicle's battery. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in battery-turbine vehicle devices. Generally, electric vehicles are becoming increasingly common; however, keeping them charged over long distances may be difficult. Gas stations may not have electric vehicle charging stations along busy roadways. Accordingly, people may need to constantly stop and charge their vehicle on long trips. However, some long trips may not be possible with electric vehicles, because of the low battery charge.

Further, most electric vehicles have a limited driving range on a single charge of their electric storage batteries. In addition, currently, there are relatively few places accessible to the public for recharging the batteries of an all-electric vehicle compared to the number of gasoline and diesel refueling stations; and, in any case, the time required to recharge the batteries is significantly longer than the time required to fill the fuel tank of a vehicle that runs on gasoline or diesel fuel. Driving an all-electric vehicle beyond its rated driving range and to a location that lacks suitable battery charging facilities would likely mean incurring the time and expense for tow truck assistance before the driver could be underway again. To avoid that fate, and to promote public acceptance of all-electric vehicles, it would be desirable to harness wind energy to help maintain some of the charge in the electric storage battery of an all-electric vehicle while the vehicle is being driven, as well as to charge the battery by harnessing wind energy while the vehicle is parked.

Accordingly, there is a demand for an improved battery-turbine vehicle device that provides users with an electric vehicle equipped with a wind turbine to charge the vehicle's battery. More particularly, there is a demand for a battery-turbine vehicle device that features several air ducts that are connected to the wind turbine, such that as the vehicle travels, the wind turbine can charge the battery.

Therefore, there exists a long-felt need in the art for a battery-turbine vehicle device that provides users with an electric vehicle equipped with wind turbines to help increase the operational length of the battery. There is also a long-felt need in the art for a battery-turbine vehicle device that features several air ducts through the vehicle that connect to a wind turbine such that, as the vehicle travels at higher speeds, the turbine can charge the battery. Further, there is a long-felt need in the art for a battery-turbine vehicle device that maintains additional power to the vehicle battery to improve the battery charge and running time. Moreover, there is a long-felt need in the art for a device that reduces the number of times a vehicle needs to be charged to accommodate long distance trips with an electric vehicle. Further, there is a long-felt need in the art for a battery-turbine vehicle device that when the vehicle is running at higher speeds, the wind turbine will either be charging the battery or running the vehicle. Finally, there is a long-felt need in the art for a battery-turbine vehicle device that provides the electric vehicle with increased power and longer running times when operated at a given speed.

The subject matter disclosed and claimed herein, in one embodiment thereof, comprises a battery-turbine vehicle device. The device is an electric vehicle with improved running time. The battery-turbine vehicle device comprises a wind turbine and a plurality of air ducts positioned through the vehicle and connected to the wind turbine. Thus, when the vehicle is running at high speeds, the wind turbine will either be charging the battery or running the vehicle. Accordingly, the device provides the electric vehicle with increased power and longer running times when operated at a given speed. Thus, the wind turbine helps generate additional power to the battery, reducing the number of times the vehicle needs to be charged while on the road.

In this manner, the battery-turbine vehicle device of the present invention accomplishes all of the foregoing objectives and provides users with a device that increases the operational length of a vehicle's battery. The device comprises an electric vehicle equipped with a wind turbine. The device operates at high speeds.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a battery-turbine vehicle device. The device is an electric vehicle with improved running time. The battery-turbine vehicle device comprises a wind turbine and a plurality of air ducts or air tunnels positioned through the vehicle and connected to the wind turbine. Thus, when the vehicle is running at high speeds, the wind turbine will either be charging the battery or running the vehicle. Accordingly, the device provides the electric vehicle with increased power and longer running times when operated at a given speed. Thus, the wind turbine helps generate additional power to the battery, reducing the number of times the vehicle needs to be charged while on the road.

In one embodiment, the battery-turbine vehicle device provides a reliable electric vehicle capable of being used by one or many passengers at normal speeds in cities and towns, on highways and byways, and in rain or shine. Typically, the battery-turbine vehicle device utilizes electrical power converted from the wind stream surrounding the electric vehicle. Specifically, the device harnesses wind energies and converts them to electrical energy.

In one embodiment, the battery-turbine vehicle device comprises a conventional electrically powered vehicle having at least one electric motor mounted therein which is connected to the vehicle transmission and driving train for propelling the vehicle. The electric motor receives electrical power from the controller unit and the controller unit gets its power from an array of rechargeable batteries. The controller unit controls the electric motor's speed using a closed-loop feedback control system. The driver presses an accelerator pedal to control the speed of the vehicle, the voltage signal from the potentiometer changes accordingly. The voltage signal from the potentiometer tells the controller how much power to deliver to the electric vehicle's motor.

Further, there would be provided a 12-volt accessory battery for powering the normal electrical components and other vehicle functions, namely the lights, radio, horn, fan, heater, defogger, and other units. The provided 12-volt accessory battery is continuously charged from the battery array by a DC-DC voltage converter/charger, not shown, built within the controller unit.

In one embodiment, the internal wind turbine of the present invention is shown mounted to the roof of an all-electric vehicle. The vehicle depicted is a 2-door sedan, but the invention can be installed on the roof of other types of all-electric vehicles, such as all-electric 4-door sedans, roadsters, vans, pickup trucks, etc. Further, the internal wind turbine can also be installed in the front hood of a vehicle, or any other suitable position on the vehicle. Additionally, the internal wind turbine can also be used in air-taxis. As stated supra, the vehicle is equipped with one or more electric storage batteries that provide electric power to the one or more drive motors that are in driving engagement with the wheels of the vehicle when the vehicle is being driven. Generally, the internal wind turbine has a housing secured to an underside of the vehicle. To minimize wind resistance and noise when the vehicle is being driven, the housing is preferably dimensioned and contoured to closely overlie an exterior surface of at least a portion of an underside of the vehicle. An air inlet opening overlies the front end of the housing and permits air to enter the wind turbine while the vehicle is in forward motion. An air outlet opening overlies the rear end of the housing and permits air to exit the wind turbine when the vehicle is in forward motion. An air flow corridor attached to the housing extends between, and joins, the air inlet and outlet openings. The air flow corridor is contoured to conduct air from the entryway portion rotationally around the shaft opening of the wind turbine and out the exit. Accordingly, with the vehicle in forward motion, as air rushes through the air flow corridor, a rotational moment is imparted to the air about the turbine shaft axis in a counterclockwise direction. The internal wind turbine further includes a turbine blade assembly disposed within the central portion of the air flow corridor. The turbine blade assembly includes a hub that extends axially along the turbine shaft axis and is rotatable about said axis. A plurality of turbine blades are distributed about the periphery of the hub.

In one embodiment, each wind turbine comprises rotor blades to capture wind energy; a shaft to transfer rotational energy to an electric generator; an electric generator to convert rotational energy into electricity; an electronic controller to monitor the wind turbine; and brakes to stop shaft rotation in case of overload and or system failure. Further, as the wind turbine is well known and is not germane to the present invention, details of such device will not be described herein. It will be understood, however, that such individual wind turbine is installed so as to provide through a common output cable a constant flow of electric energy. Such electrical energy is then applied by a wind regulator unit to a controller unit to charge the battery array of the electric vehicle.

In one embodiment, the wind streams surrounding the electric vehicle at the front of the vehicle, the top of the vehicle, the left side, and the right side of the vehicle are harnessed by air ducts or air tunnels and passed through by the funnel-like air ducts into one or more wind turbines. To collect the maximum amount of wind streams and to accelerate the collected winds, each funnel-like air duct has the largest cross-sectional area positioned at the vehicle surface to collect the maximum amount of the prospective wind stream and the smallest cross-sectional area of the air duct is directed to the wind turbine(s). The higher the level of streamlined wind achieved and the smaller the cross-sectional area of the air duct at the entry of the wind turbine, the greater the streamlined wind and the higher its velocity on entry into the wind turbine; hence, the maximum generated electricity.

In one embodiment, the plurality of air ducts includes a front wind inlet, a top wind inlet, a right-side wind inlet, and a left-side wind inlet. Each wind inlet is connected to a funnel-like air duct where the largest cross-sectional area of the air duct is positioned at the vehicle's surface to collect the maximum amount of the prospective wind stream and the smallest cross-sectional area of the air duct is positioned at the entry of the wind turbine. In one embodiment, the air ducts of the top wind inlet extend along the two sides of the fender wall then connect mechanically with all other air ducts at a point before the wind turbine, and then the streamlined winds from all air ducts are applied collectively to the blades of the wind turbine. The generated electrical energy by the wind turbine generator, not shown, is applied to the wind charger which is electrically connected to the controller unit which supplies electrical current thereto for recharging the battery array.

In one embodiment, in case of system failure or unexpected emergency, the storage battery array may be recharged by a conventional power supply unit through a connection to a suitable source of electrical energy, such as an electrical outlet within a building or residential home, etc.

In one embodiment, there is a front wind turbine and a rear wind turbine to generate more electrical energy than with just one wind turbine. In this embodiment, the front winds passing through the front wind inlet drives the front wind turbine. Further, the streamed winds from the side wind inlets and the top wind inlet combine together to drive the rear wind turbine. The electrical outputs of the generators of both the front wind turbine and the rear wind turbine are applied to the wind charger which is electrically connected to the controller unit which supplies electrical current thereto for recharging the battery array. Other alternative embodiments of the invention, in which three or more wind turbines at different locations and two or more electric motors can be easily presented.

In one embodiment, the wind turbine can be stored in the trunk until needed. In this embodiment, the external wind turbine converts ambient wind energy into electrical current to charge the electric battery of the electric vehicle while the vehicle is parked. Specifically, the external wind turbine may be stored in the trunk or other secure location within the vehicle until it is needed. In this embodiment, the external wind turbine includes an external shaft and a plurality of radially-directed arms circumferentially spaced apart around the shaft. For catching ambient wind currents, a cup is attached to an outer end of each arm. The number of arms and cups is optional, but three of each spaced at 120° intervals about the external shaft axis is the preferred number. Cups are used in the external wind turbine instead of turbine blades as a better way to harness the energy in ambient, variable, low velocity winds while the vehicle is parked.

In one embodiment, the electric vehicle has a wind turbine with flywheels rotationally engaging the wind turbine and a gear which drives the generator via a turbine shaft to produce electricity which is used for charging batteries. As the electric vehicle is engaged in forward motion at a high speed, a portion of the rotational energy transfers to the turbine shaft, which in turn transfers to the flywheels. The flywheels store mechanical energy in its rotation, while the generator produces electrical energy for charging the batteries. As the vehicle slows or stops, wind or air flow to the wind turbine decreases, decreasing the rotational energy provided by the wind turbine to the generator. Without the flywheels, the generator would generate an inadequate electric charge or stop generating electric charge for the batteries. However, the flywheels continue to rotate when the vehicle slows down or stops after being driven in a forward direction because mechanical energy had been stored in the rotation of the flywheel. This stored mechanical energy is transferred from the flywheels to the wind turbine, enabling the wind turbine to continue rotating to provide power for the generator.

In yet another embodiment, the battery-turbine vehicle device comprises a plurality of indicia.

In yet another embodiment, a method of charging a battery for an electric vehicle via a wind turbine is disclosed. The method includes the steps of providing a battery-turbine vehicle device comprising an electric vehicle with an integrated wind turbine and air ducts. The method also comprises operating the electric vehicle at such a speed that air enters the air ducts and is transported to the wind turbine. Further, the method comprises charging the battery of the electric vehicle via the wind harnessed by the integrated wind turbine. Finally, the method comprises maintaining additional power to the vehicle battery via the wind turbine, to improve the battery charge and running time and reduce the number of times the vehicle needs to be charged.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
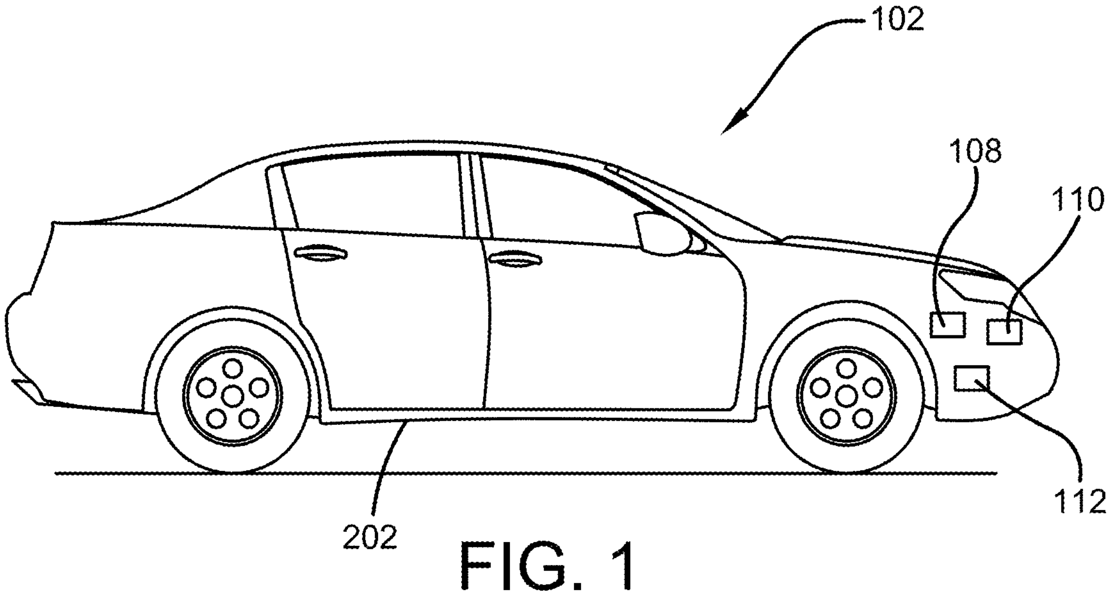
FIG. 1 illustrates a perspective view of one embodiment of the battery-turbine vehicle device of the present invention showing the electric vehicle of the device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a battery-turbine vehicle device that provides users with an electric vehicle equipped with wind turbines to help increase the operational length of the battery. There is also a long-felt need in the art for a battery-turbine vehicle device that features several air ducts through the vehicle that connect to a wind turbine such that, as the vehicle travels at higher speeds, the turbine can charge the battery. Further, there is a long-felt need in the art for a battery-turbine vehicle device that maintains additional power to the vehicle battery to improve the battery charge and running time. Moreover, there is a long-felt need in the art for a device that reduces the number of times a vehicle needs to be charged to accommodate long distance trips with an electric vehicle. Further, there is a long-felt need in the art for a battery-turbine vehicle device that when the vehicle is running at higher speeds, the wind turbine will either be charging the battery or running the vehicle. Finally, there is a long-felt need in the art for a battery-turbine vehicle device that provides the electric vehicle with increased power and longer running times when operated at a given speed.

The present invention, in one exemplary embodiment, is a novel battery-turbine vehicle device. The battery-turbine vehicle device comprises a wind turbine and a plurality of air ducts positioned through an electric vehicle and connected to the wind turbine. Thus, when the vehicle is running at high speeds, the wind turbine will either be charging the battery or running the vehicle. Accordingly, the device provides the electric vehicle with increased power and longer running times when operated at a given speed. Thus, the wind turbine helps generate additional power to the battery, reducing the number of times the vehicle needs to be charged while on the road. The present invention also includes a novel method of charging a battery for an electric vehicle via a wind turbine. The method includes the steps of providing a battery-turbine vehicle device comprising an electric vehicle with an integrated wind turbine and air ducts. The method also comprises operating the electric vehicle at such a speed that air enters the air ducts and is transported to the wind turbine. Further, the method comprises charging the battery of the electric vehicle via the wind harnessed by the integrated wind turbine. Finally, the method comprises maintaining additional power to the vehicle battery via the wind turbine, to improve the battery charge and running time and reduce the number of times the vehicle needs to be charged.

Referring initially to the drawings, FIG. 1 illustrates a perspective view of one embodiment of the battery-turbine vehicle device 100 of the present invention. In the present embodiment, the battery-turbine vehicle device 100 is an improved battery-turbine vehicle device 100 that provides a user with an electric vehicle 102 equipped with a wind turbine 104 to charge the vehicle's battery 108. Specifically, the battery-turbine vehicle device 100 comprises an electric vehicle 102 with an integrated wind turbine 104 and a plurality of air ducts 106 or air tunnels connected to the wind turbine 104 to harness the air flowing past the electric vehicle 102. Thus, when the vehicle 102 is running at high speeds, the wind turbine 104 will either be charging the battery 108 or running the vehicle 102. Accordingly, the device 100 provides the electric vehicle 102 with increased power and longer running times when operated at a given speed.

Generally, the battery-turbine vehicle device 100 provides a reliable electric vehicle 102 capable of being used by one or many passengers at normal speeds in cities and towns, on highways and byways, and in rain or shine. Typically, the battery-turbine vehicle device 100 utilizes electrical power converted from the wind stream surrounding the electric vehicle 102. Specifically, the device 100 harnesses wind energies and converts them to electrical energy.

Furthermore, the battery-turbine vehicle device 100 comprises a conventional electrically powered vehicle 102 having at least one electric motor 110 mounted therein which is connected to the vehicle transmission and driving train for propelling the vehicle 102. The electric motor 110 receives electrical power from the controller unit 112 and the controller unit 112 gets its power from an array of rechargeable batteries 108. The controller unit 112 controls the electric motor's speed using a closed-loop feedback control system. The driver presses an accelerator pedal to control the speed of the vehicle 102, the voltage signal from the potentiometer changes accordingly. The voltage signal from the potentiometer tells the controller 112 how much power to deliver to the electric vehicle's motor 110.

Further, there would be provided a 12-volt accessory battery (not shown) for powering the normal electrical components and other vehicle functions, namely the lights, radio, horn, fan, heater, defogger, and other units. The provided 12-volt accessory battery is continuously charged from the battery array 108 by a DC-DC voltage converter/charger, not shown, built within the controller unit 112.

Figure 2:
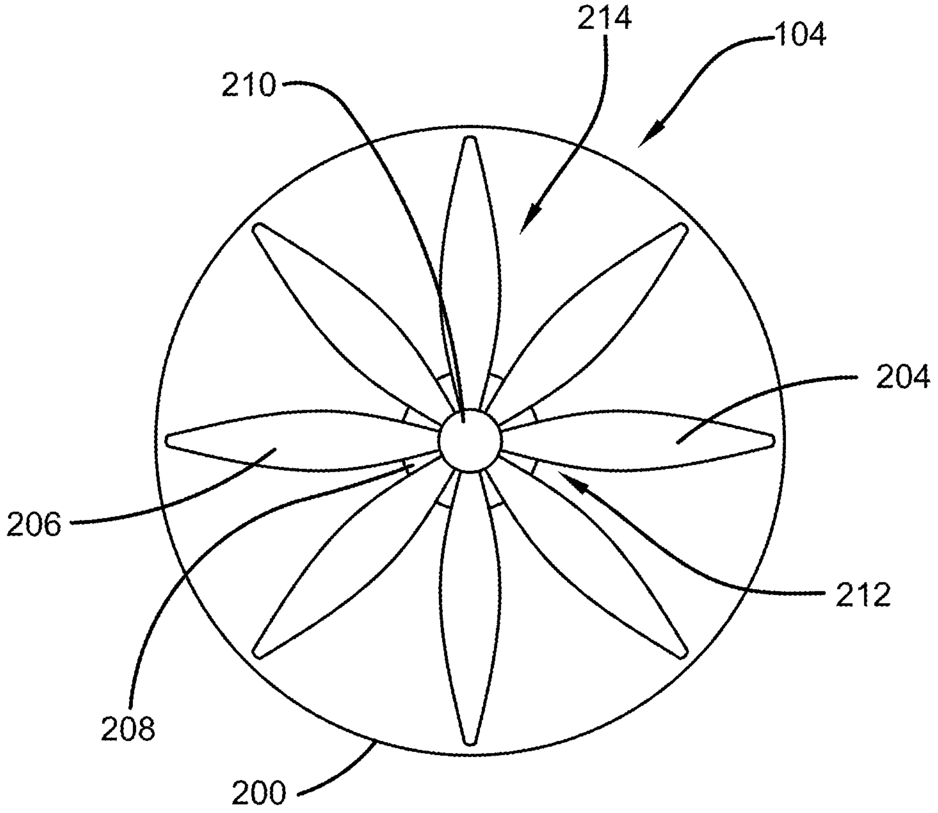
FIG. 2 illustrates a perspective view of one embodiment of the battery-turbine vehicle device of the present invention showing the wind turbine of the device in accordance with the disclosed architecture.

As shown in FIG. 2, the wind turbine 104 of the present invention is shown mounted to an all-electric vehicle 102. Further, the wind turbine 104 can also be installed in the front hood of a vehicle 102, or any other suitable position on the vehicle 102. Additionally, the internal wind turbine 104 can also be used in air-taxis. The vehicle 102 depicted is a 2-door sedan, but the invention can be installed on other types of electric vehicles 102, such as electric 4-door sedans, roadsters, vans, pickup trucks, etc. As stated supra, the vehicle 102 is equipped with one or more electric storage batteries 108 that provide electric power to one or more drive motors 110 that are in driving engagement with the wheels of the vehicle 102 when the vehicle 102 is being driven. Generally, the internal wind turbine 104 has a housing 200 secured to an underside 202 of the vehicle 102. To minimize wind resistance and noise when the vehicle 102 is being driven, the housing 200 is preferably dimensioned and contoured to closely overlie an exterior surface of at least a portion of an underside 202 of the vehicle 102. An air inlet opening 204 overlies the front end of the housing 200 and permits air to enter the wind turbine 104 while the vehicle 102 is in forward motion. An air outlet opening 206 overlies the rear end of the housing 200 and permits air to exit the wind turbine 104 when the vehicle 102 is in forward motion. An air flow corridor 208 attached to the housing 200 extends between and joins, the air inlet 204 and outlet 206 openings. The air flow corridor 208 is contoured to conduct air from the entryway portion 204 rotationally around the shaft opening of the wind turbine 104 and out the exit 206. Accordingly, with the vehicle 102 in forward motion, as air rushes through the air flow corridor 208, a rotational moment is imparted to the air about the turbine shaft 210 axis in a counterclockwise direction. The internal wind turbine 104 further includes a turbine blade assembly 212 disposed within the central portion of the air flow corridor 208. The turbine blade assembly 212 includes a hub that extends axially along the turbine shaft 210 axis and is rotatable about said axis. A plurality of turbine blades 214 are distributed about the periphery of the hub.

Furthermore, each wind turbine 104 comprises: rotor blades 214 to capture wind energy; a shaft 210 to transfer rotational energy to an electric generator 216; an electric generator 216 to convert rotational energy into electricity; an electronic controller 218 to monitor the wind turbine 104; and brakes 220 to stop shaft 210 rotation in case of overload and or system failure. Further, as the wind turbine 104 is well known and is not germane to the present invention, details of such device will not be described herein. It will be understood, however, that such individual wind turbine 104 is installed so as to provide through a common output cable a constant flow of electric energy. Such electrical energy is then applied by a wind regulator unit to a controller unit 112 to charge the battery array 108 of the electric vehicle 102.

Figure 3:
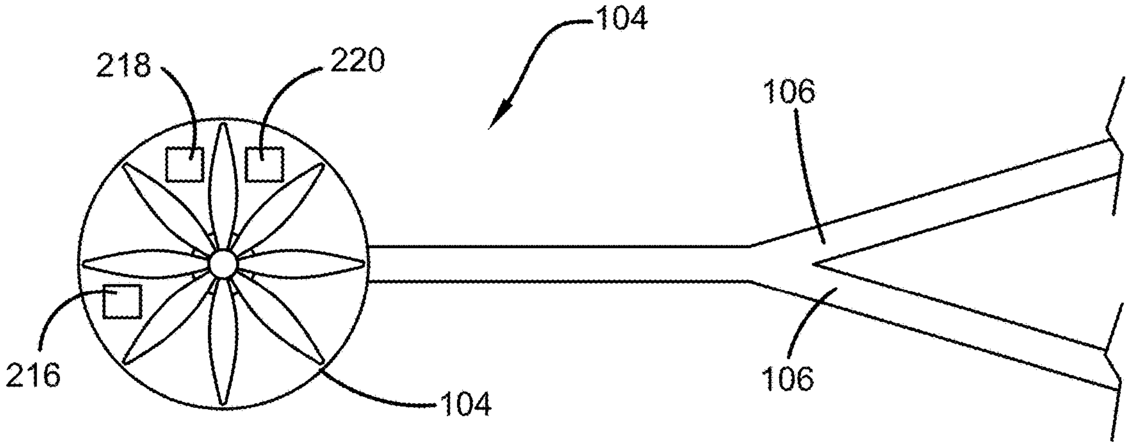
FIG. 3 illustrates a perspective view of one embodiment of the battery-turbine vehicle device of the present invention showing the plurality of air ducts connected to the wind turbine of the device in accordance with the disclosed architecture.
Figure 4:
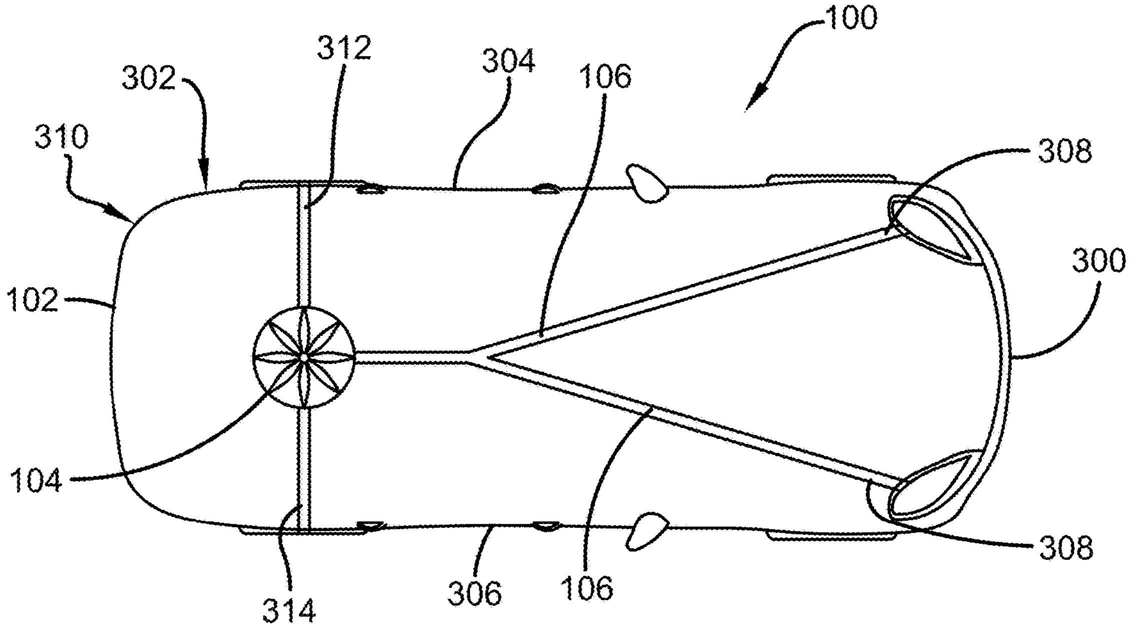
FIG. 4 illustrates a perspective view of one embodiment of the battery-turbine vehicle device of the present invention showing the wind turbine integrated into the vehicle in accordance with the disclosed architecture.

As shown in FIGS. 3-4, the wind streams surrounding the electric vehicle 102 at the front 300 of the vehicle 102, the top 302 of the vehicle 102, the left side 304, and the right side 306 of the vehicle 102 are harnessed by air ducts 106 or air tunnels and passed through by the funnel-like air ducts into one or more wind turbines 104. To collect the maximum amount of wind streams and to accelerate the collected winds, each funnel-like air duct 106 has the largest cross-sectional area positioned at the vehicle surface to collect the maximum amount of the prospective wind stream and the smallest cross-sectional area of the air duct 106 is directed to the wind turbine(s) 104. The higher the level of streamlined wind achieved and the smaller the cross-sectional area of the air duct 106 at the entry of the wind turbine 104, the greater the streamlined wind and the higher will be its velocity on entry into the wind turbine 104, hence, the maximum generated electricity.

Furthermore, the plurality of air ducts 106 include a front wind inlet 308, a top wind inlet 310, a right-side wind inlet 312, and a left-side wind inlet 314. Each wind inlet 308, 310, 312, 314 is connected to a funnel-like air duct 106 where the largest cross-sectional area of the air duct 106 is positioned at the vehicle's surface to collect the maximum amount of the prospective wind stream and the smallest cross-sectional area of the air duct 106 is positioned at the entry of the wind turbine 104. In one embodiment, the air ducts 106 of the top wind inlet 310 extend along the two sides of the fender wall then connect mechanically with all other air ducts 106 at a point before the wind turbine 104, and then the streamlined winds from all air ducts 106 are applied collectively to the blades 214 of the wind turbine 104. The generated electrical energy by the wind turbine generator 216 is applied to the wind charger which is electrically connected to the controller unit 112 which supplies electrical current thereto for recharging the battery array 108.

In one embodiment, in case of system failure or unexpected emergency, the storage battery array 108 may be recharged by a conventional power supply unit through a connection to a suitable source of electrical energy, such as an electrical outlet within a building or residential home, etc.

Figure 5:
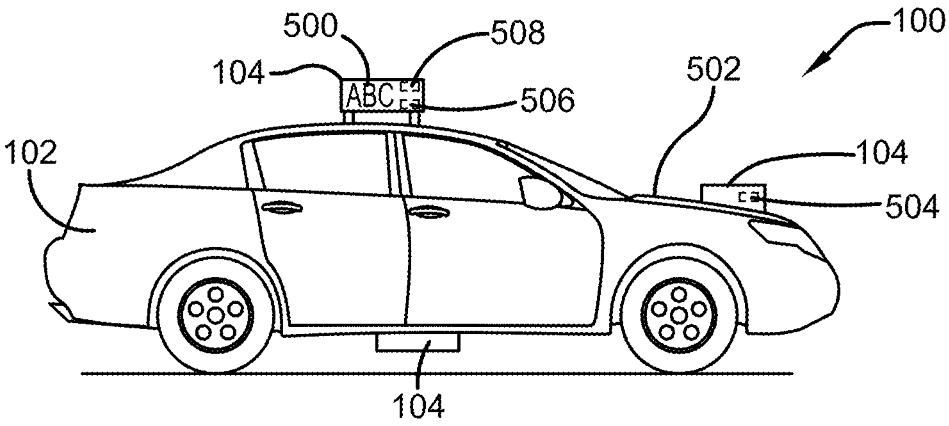
FIG. 5 illustrates a perspective view of one embodiment of the battery-turbine vehicle device of the present invention showing the device with multiple wind turbines in accordance with the disclosed architecture.

As shown in FIG. 5, there is a front wind turbine 104 and a rear wind turbine 105 to generate more electrical energy than with just one wind turbine 104. In this embodiment, the front winds passing through the front wind inlet 308 drives the front wind turbine 104. Further, the streamed winds from the side wind inlets 312, 314 and the top wind inlet 310 combine together to drive the rear wind turbine 105. The electrical outputs of the generators 216 of both the front wind turbine 104 and the rear wind turbine 105 are applied to the wind charger which is electrically connected to the controller unit 112 which supply electrical current thereto for recharging the battery array 108. Other alternative embodiments of the invention, in which three or more wind turbines 104 at different locations and two or more electric motors 110 can be easily presented.

In one embodiment, the wind turbine 104 can be stored in the trunk 502 until needed. In this embodiment, the external wind turbine 104 converts ambient wind energy into electrical current to charge the electric battery 108 of the electric vehicle 102 while the vehicle 102 is parked. Specifically, the external wind turbine 104 may be stored in the trunk 502 or other secure location within the vehicle 102 until it is needed. In this embodiment, the external wind turbine 104 includes an external shaft 210 and a plurality of radially-directed arms (i.e., blades 214) circumferentially spaced apart around the shaft 210. For catching ambient wind currents, a cup 504 is attached to an outer end of each arm 214. The number of arms 214 and cups 504 is optional, but three of each spaced at 120° intervals about the external shaft axis is the preferred number. Cups 504 are used in the external wind turbine 104 instead of turbine blades 214 as a better way to harness the energy in ambient, variable, low velocity winds while the vehicle 102 is parked.

In another embodiment, the electric vehicle 102 has a wind turbine 104 with flywheels 506 rotationally engaging the wind turbine 104, and a gear 508 which drives the generator 216 via a turbine shaft 210 to produce electricity which is used for charging batteries 108. As the electric vehicle 102 is engaged in forward motion at a high speed, a portion of the rotational energy transfers to the turbine shaft 210, which in turn transfers to the flywheels 506. The flywheels 506 store mechanical energy in its rotation, while the generator 216 produces electrical energy for charging the batteries 108. As the vehicle 102 slows or stops, wind or air flow to the wind turbine 104 decreases, decreasing the rotational energy provided by the wind turbine 104 to the generator 216. Without the flywheels 506, the generator 216 would generate an inadequate electric charge or stop generating electric charge for the batteries 108. However, the flywheels 506 continue to rotate when the vehicle 102 slows down or stops after being driven in a forward direction because mechanical energy had been stored in the rotation of the flywheel 506. This stored mechanical energy is transferred from the flywheels 506 to the wind turbine 104, enabling the wind turbine 104 to continue rotating to provide power for the generator 216.

In yet another embodiment, the battery-turbine vehicle device 100 comprises a plurality of indicia 500. The wind turbine 104 of the device 100 may include advertising, a trademark, or other letters, designs, or characters, printed, painted, stamped, or integrated into the wind turbine 104, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be electric vehicle, wind turbine, or brand related.

Figure 6:
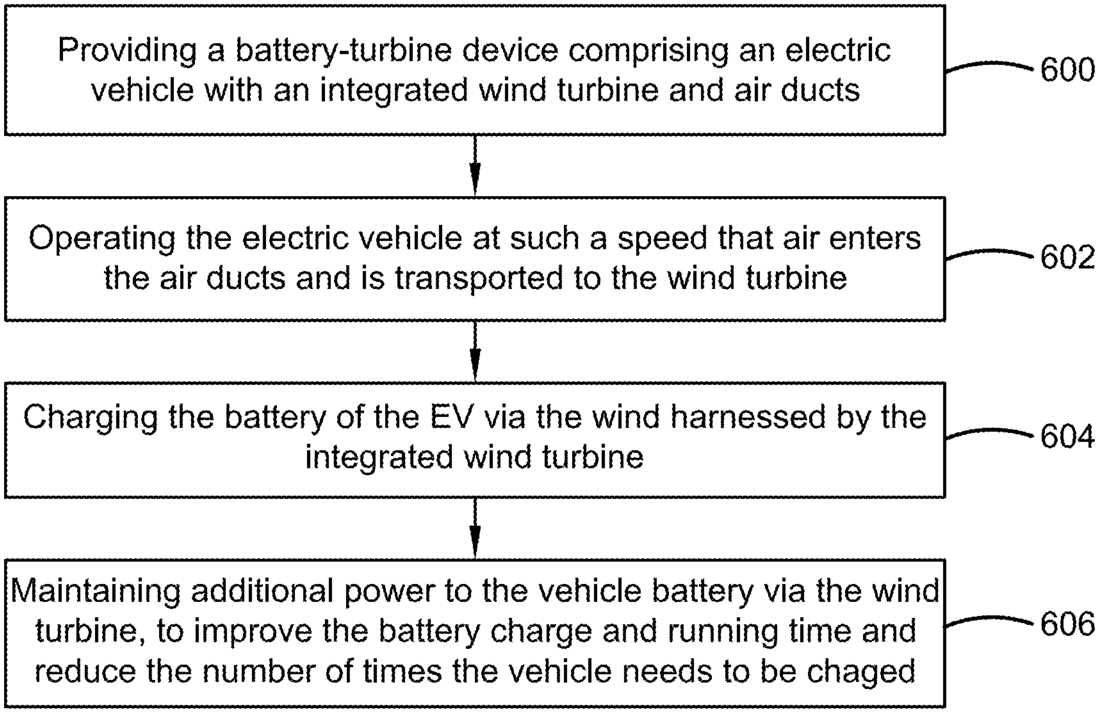
FIG. 6 illustrates a flowchart showing the method of charging a battery for an electric vehicle via a wind turbine in accordance with the disclosed architecture.

FIG. 6 illustrates a flowchart of the method of charging a battery for an electric vehicle via a wind turbine. The method includes the steps of at 600, providing a battery-turbine vehicle device comprising an electric vehicle with an integrated wind turbine and air ducts. The method also comprises at 602, operating the electric vehicle at such a speed that air enters the air ducts and is transported to the wind turbine. Further, the method comprises at 604, charging the battery of the electric vehicle via the wind harnessed by the integrated wind turbine. Finally, the method comprises at 606, maintaining additional power to the vehicle battery via the wind turbine, to improve the battery charge and running time and reduce the number of times the vehicle needs to be charged.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "battery-turbine vehicle device", "turbine device", "vehicle device", and "device" are interchangeable and refer to the battery-turbine vehicle device 100 of the present invention.

Notwithstanding the foregoing, the battery-turbine vehicle device 100 of the present invention can be of any suitable size and configuration as is known in the art without affecting the overall concept of the invention, provided that it accomplishes the above-stated objectives. One of ordinary skill in the art will appreciate that the battery-turbine vehicle device 100 as shown in FIGS. 1-6 is for illustrative purposes only, and that many other sizes and shapes of the battery-turbine vehicle device 100 are well within the scope of the present disclosure. Although the dimensions of the battery-turbine vehicle device 100 are important design parameters for user convenience, the battery-turbine vehicle device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A battery-turbine vehicle device for an electric vehicle, the battery-turbine vehicle device comprising:
- a wind turbine;
- wherein the wind turbine is integrated into the electric vehicle;
- wherein the wind turbine harnesses air flowing past the electric vehicle to charge an electric vehicle's battery;
- wherein when the electric vehicle is running at high speeds, the wind turbine will either be charging the electric vehicle's battery or running the electric vehicle;
- wherein the electric vehicle comprises a conventional electrically powered vehicle having at least one electric motor mounted therein;
- wherein the at least one electric motor receives electrical power from a controller unit and the controller unit gets its power from an array of rechargeable batteries;
- wherein the wind turbine has a housing secured to a hood of the electric vehicle;
- wherein an air inlet opening overlies a front end of the housing and permits air to enter the wind turbine while the electric vehicle is in forward motion and the air outlet opening overlies a rear end of the housing and permits air to exit the wind turbine when the electric vehicle is in forward motion;
- wherein an air flow corridor attached to the housing extends between, and joins, the air inlet and outlet openings, wherein the air flow corridor is contoured to conduct air rotationally around a shaft of the wind turbine and out; and
- further wherein the wind turbine comprises rotor blades to capture wind energy; a shaft to transfer rotational energy to an electric generator; an electric generator to convert rotational energy into electricity; and brakes to stop shaft rotation in case of overload and or system failure.

2. The battery-turbine vehicle device of claim 1, wherein wind streams surrounding the electric vehicle at a front, a top, a left side and a right side of the electric vehicle are harnessed by air ducts into the wind turbine.

3. The battery-turbine vehicle device of claim 2, wherein the air ducts include a front wind inlet, a top wind inlet, a right-side wind inlet, and a left-side wind inlet.

4. The battery-turbine vehicle device of claim 3, wherein streamline winds from all the air ducts are applied collectively to the wind turbine.

5. The battery-turbine vehicle device of claim 4, wherein in case of system failure or unexpected emergency, the array of rechargeable batteries may be recharged by a conventional power supply unit through a connection to a suitable source of electrical energy.

6. The battery-turbine vehicle device of claim 5, wherein there are two wind turbines integrated into the electric vehicle.

7. A battery-turbine vehicle device for an electric vehicle, the battery-turbine vehicle device comprising:
- an electric vehicle comprising at least one electric motor mounted therein; and
- a wind turbine comprising a housing secured to an underside of the electric vehicle;
- wherein the at least one electric motor receives electrical power from a controller unit and the controller unit gets its power from an array of rechargeable batteries;
- wherein an air inlet opening overlies a front end of the housing and permits air to enter the wind turbine while the electric vehicle is in forward motion and an air outlet opening overlies a rear end of the housing and permits air to exit the wind turbine when the electric vehicle is in forward motion;
- wherein an air flow corridor attached to the housing extends between, and joins, the air inlet and outlet openings, wherein the air flow corridor is contoured to conduct air rotationally around a shaft of the wind turbine and out;
- wherein the wind turbine comprises rotor blades to capture wind energy; a shaft to transfer rotational energy to an electric generator; an electric generator to convert rotational energy into electricity; the electronic controller to monitor the wind turbine; and brakes to stop shaft rotation in case of overload and or system failure;
- wherein wind streams surrounding the electric vehicle at a front, a top, a left side and a right side of the electric vehicle are harnessed by air ducts into the wind turbine;
- wherein the air ducts include a front wind inlet, a top wind inlet, a right-side wind inlet, and a left-side wind inlet;
- wherein streamline winds from all the air ducts are applied collectively to the wind turbine; and
- wherein the wind turbine harnesses air flowing past the electric vehicle to charge the array of rechargeable batteries.

8. The battery-turbine vehicle device of claim 7, wherein in case of system failure or unexpected emergency, the array of rechargeable batteries may be recharged by a conventional power supply unit through a connection to a suitable source of electrical energy.

9. The battery-turbine vehicle device of claim 7 wherein the battery-turbine vehicle device is used with an air taxi.

10. The battery-turbine vehicle device of claim 9, wherein there is a front wind turbine at a front of the electric vehicle and a rear wind turbine at a rear of the electric vehicle.

11. The battery-turbine vehicle device of claim 10, wherein front winds passing through the front wind inlet drives the front wind turbine and streamed winds from the right-side and left-side wind inlets and the top wind inlet combined together to drive the rear wind turbine.

12. The battery-turbine vehicle device of claim 7, wherein the wind turbine comprises a plurality of radially-directed arms with a cup spaced apart around the shaft for harnessing wind energy in low velocity winds while the electric vehicle is parked.

13. The battery-turbine vehicle device of claim 7, wherein the wind turbine comprises flywheels which store mechanical energy in its rotation.

* * * * *